(12) United States Patent
Novotny et al.

(10) Patent No.: US 9,790,776 B2
(45) Date of Patent: *Oct. 17, 2017

(54) RAPID DEPLOYMENT FRAC WATER TRANSFER SYSTEM

(71) Applicant: TETRA TECHNOLOGIES, INC., The Woodlands, TX (US)

(72) Inventors: John Novotny, Houston, TX (US); Scott Richie, The Woodlands, TX (US); Reza Talabi, Spring, TX (US)

(73) Assignee: TETRA Technologies, Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,057

(22) Filed: Jun. 21, 2016

(65) Prior Publication Data

US 2016/0369608 A1 Dec. 22, 2016

Related U.S. Application Data (63) Continuation of application No. 13/296,928, filed on Nov. 15, 2011, now Pat. No. 9,371,723.

(60) Provisional application No. 61/414,132, filed on Nov. 16, 2010.

(51) Int. Cl.
*E21B 43/26* (2006.01)
*F16L 1/024* (2006.01)
*E21B 19/22* (2006.01)
*B65H 75/42* (2006.01)

(52) U.S. Cl.
CPC ........... *E21B 43/26* (2013.01); *B65H 75/425* (2013.01); *E21B 19/22* (2013.01); *F16L 1/0243* (2013.01); *Y10T 137/0402* (2015.04); *Y10T 137/6918* (2015.04); *Y10T 137/8593* (2015.04)

(58) Field of Classification Search
CPC ......... E21B 43/26; E21B 19/22; F16L 1/0243
See application file for complete search history.

(56) References Cited

U.S. PATENT DOCUMENTS

| | | |
|---|---|---|
| 4,416,329 A | 11/1983 | Tanner et al. |
| 4,570,673 A | 2/1986 | Kendrick et al. |
| 4,603,887 A | 8/1986 | Mayfield et al. |
| 4,875,526 A | 10/1989 | Latino et al. |
| 7,128,091 B2 | 10/2006 | Istre, Jr. |
| 8,021,097 B2 | 9/2011 | McVaugh |
| 9,371,723 B2 * | 6/2016 | Novotny et al. ........ E21B 19/22 |
| 2005/0056435 A1 | 3/2005 | Price et al. |
| 2006/0000515 A1 | 1/2006 | Huffman |
| 2006/0024136 A1 | 2/2006 | Jowell et al. |
| 2007/0061274 A1 | 3/2007 | Gipps et al. |
| 2007/0131432 A1 | 6/2007 | Pleskie |
| 2009/0008105 A1 | 1/2009 | Price et al. |
| 2009/0218106 A1 | 9/2009 | Stukey et al. |

(Continued)

OTHER PUBLICATIONS

Kidde Fire Fighting, "Angus Flexible Pipelines," A UTC Fire and Security Company, 2008 http://222.kidde-fire.com/utcfs/Templates/Pages/Template-46/0.8060.pageid%3D19617%26siteid%3D465.00.html.

(Continued)

*Primary Examiner* — Kevin Lee
(74) *Attorney, Agent, or Firm* — Brett A. North (57) ABSTRACT

Methods, systems, and computer program products are provided for rapid deployment and retrieval of a frac water transfer system.

12 Claims, 9 Drawing Sheets

(56) References Cited

U.S. PATENT DOCUMENTS

2009/0283261 A1 11/2009 Poitzsch et al.
2010/0059226 A1 3/2010 Termine et al.

OTHER PUBLICATIONS

Kidde Fire Fighting, Angus Flexible Pipelines, Super Aquaduct, Potable Water Delivery Pipeline, 2007.
Kidde Fire Fighting, National Foam, Major innovations in tire fighting technology, 2007.
Kidde Fire Fighting, Big Flow Specialized Pumping Solutions, 2007.
International Search Report and Written Opinion date Mar. 27, 2012 for co-pending PCT patent app. No. PCT/US2011/060805.

* cited by examiner

RAPID DEPLOYMENT FRAC WATER TRANSFER SYSTEM

CROSS-REFERENCE TO RELATED APPLICATIONS

This is a continuation of U.S. patent application Ser. No. 13/296,928, filed Nov. 15, 2011 (issuing as U.S. Pat. No. 9,371,723 on Jun. 21, 2016) which claims the benefit of U.S. Provisional Application Ser. No. 61/414,132, filed Nov. 16, 2010. Each of these applications are incorporated herein by reference and priority of each is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The invention relates generally to the rapid deployment and retrieval of a frac water transfer system used in oil and gas operations, and more particularly, to the rapid deployment and retrieval of a frac water transfer system used for hydraulic fracturing operations.

2. General Background

Hydraulic fracturing is a process used in the oil and gas industry to stimulate the production rate of a well. This process is also known as "fracing," or conducting a "frac job," in the industry. Techniques used in hydraulic fracturing generally involve injecting a fluid down a well at a high pressure. The injected fluid fractures the subterranean formation surrounding the well. A proppant may also be added to the fluid to aid in propping the fractures. The fractures create channels through which oil and/or gas can flow, facilitating the flow of the oil and/or gas to the well for production.

A typical preliminary step in preparing a frac job is transporting a large volume of water ("frac water") from a water source to a certain destination. The destination may be any receptacle suitable for holding frac water located in the vicinity of where the frac job will be carried out, including, but not limited to, a buffer pit, a frac pit, a frac tank, or a work tank.

BRIEF SUMMARY OF THE INVENTION

One or more embodiments of the invention relate to a system for transferring frac water between a source of the frac water and a frac water destination.

The system may comprise a subsystem for determining one or more characteristics of the frac water transfer system, and a portable frac water delivery subsystem.

The subsystem for determining one or more characteristics of the frac water transfer system may comprise means for measuring one or more terrain parameters between the frac water source and the frac water destination, and means for designing a pipeline to be assembled between the frac water source and the frac water destination.

The means for designing may receive the one or more terrain parameters as input and generate output data.

The output data may be presented as a set of pressure profiles reflecting one or more measurements relating to one or more characteristics of the pipeline to be assembled.

The portable frac water delivery subsystem may comprise one or more segments of lay flat hose and one or more tracked carriers for transporting the lay flat hose.

The one or more segments of the lay flat hose may be connected in series to assemble one or more pipelines for transferring the frac water from the source of the frac water to the frac water destination.

Each of the tracked carriers may comprise a lifting subsystem and a tensioning subsystem.

The lifting subsystem may be used to load the one or more spools onto the tracked carrier and/or offloading the one or more spools from the tracked carrier.

The lifting subsystem may comprise an arm.

One or more linkages may connect the arm to the tracked carrier.

To control the arm, one or more hydraulic cylinders may be used to move the one or more linkages.

The arm may be used to selectively engage the one or more spools.

The tensioning subsystem may be used to flatten the one or more segments of the lay flat hose to be wound onto the one or more spool.

Further, the tensioning subsystem may be used to substantially remove water from the one or more segments of the lay flat hose.

The tensioning subsystem may comprise a drive subsystem for rotating the one or more spools.

A plurality of rollers may selectively engage the one or more segments of the lay flat hose onto the one or more spools.

The one or more segments of the lay flat hose may be routed through the plurality of rollers in an alternating over and under configuration.

The system may further comprise one or more conveyance vehicles for transporting equipment between an equipment storage site and the frac water source and/or the frac water destination, the equipment comprising the one or more spools.

One or more embodiments of the invention relate to a method of deploying a system for transferring frac water between a source of the frac water and a frac water destination.

The method may involve determining one or more characteristics of the frac water transfer system;

deploying a portable frac water delivery subsystem; and assembling one or more pipelines for transferring the frac water from the source of the frac water to the frac water destination.

Determining one or more characteristics of the frac water transfer system may involve measuring one or more terrain parameters between a water source and a water destination and determining one or more pipeline design parameters.

One or more pipelines to be assembled may be designed using a means for designing. The means for designing may receive the one or more terrain parameters and the one or more design parameters as input.

The means for designing may further generate output data presented as a set of pressure profiles reflecting one or more measurements relating to one or more characteristics of the pipeline to be assembled.

The portable frac water delivery subsystem may comprise one or more segments of lay flat hose and one or more tracked carriers for transporting the lay flat hose.

Each tracked carrier may comprise a tensioning subsystem for flattening the one or more segments of the lay flat hose to be wound onto one or more spools.

The method may further involve conveying one or more spools to the frac water source and/or the frac water destination, the one or more spools wound with the one or more segments of the lay flat hose.

The method may further involve loading the spools onto the one or more tracked carriers and/or offloading the one or more spools from the one or more tracked carriers.

The tracked carriers may further comprise a lifting subsystem for loading and/or offloading the one or more spools.

The lifting subsystem may comprise an arm.

One or more linkages may connect the arm to the tracked carrier.

To control the arm, one or more hydraulic cylinders may be used to move the one or more linkages.

The arm may be used to selectively engage the one or more spools.

The method may further involve retrieving the one or more segments of the lay flat hose from the ground.

Retrieval may involve selectively engaging the tensioning subsystem with the one or more segments of the lay flat hose.

The tensioning subsystem may further comprise a plurality of rollers, and a drive subsystem for rotating the one or more spools.

Retrieval may further involve routing the one or more segments of the lay flat hose through the plurality of rollers; winding the one or more segments of the lay flat hose onto the one or more spools; and substantially removing water from the one or more segments of the lay flat hose.

Assembling the pipeline may involve connecting a plurality of segments of the lay flat hose in series.

The ends of the segments of the lay flat hose may be fitted with sexless, easy to connect couplings.

One or more embodiments of the invention may relate to a computer program product.

The computer program product may comprise a computer usable medium having computer readable code embodied thereon for determining one or more characteristics of a frac water transfer system.

The computer readable program code may comprise computer program code for receiving one or more terrain parameters as input; computer readable program code for receiving one or more design parameters as input; and computer readable code for generating output data based on at least one of: at least one terrain parameter and at least one design parameter.

The one or more terrain parameters may comprise at least one of: distances between adjacent points along a flow path of the frac water transfer system, elevations at points along the flow path, one or more parameters indicative of a degree of obstruction of the flow path, and one or more measurements taken by measurement devices disposed along the flow path, the one or more measurements relating to the one or more characteristics.

The one or more design parameters may comprise at least one of: a number of one or more pumps along the flow path, placement locations of the one or more pumps along the flow path, a number of one or more filter pods along the flow path, and placement locations of the one or more filter pods along the flow path.

The output data may relate to one or more characteristics of the frac water transfer system, including, but not limited to: water hammer or hydraulic shock effects, wave velocity, friction, hydrostatic head, hydraulic force, pressure loss due to friction, and positive pressure needed to overcome friction.

The computer program product may further comprise computer readable program code for adjusting at least one of: at least one terrain parameter and at least one design parameter to generate at least one adjusted parameter.

The at least one adjusted parameter may comprise: an adjustment to at least one of: the one or more parameters indicative of a degree of obstruction of the flow path, the number of pumps, the placement locations of the pumps along the flow path, the number of filter pods, and the placement locations of the filter pods along the flow path.

Computer readable program code may receive the at least one adjusted parameter as input and generate updated output data based on the at least one adjusted parameter.

The output data may be presented to a user as a set of pressure profiles reflecting one or more measurements relating to the one or more characteristics of the frac water transfer system.

The computer program product may further comprise computer readable program code for generating final output data from the updated output data on the condition that at least one characteristic of the frac water transfer system represented by updated output data is within a predetermined range from a desired value of the at least one characteristic.

DETAILED DESCRIPTION OF THE INVENTION

Frac water may be obtained from one or more sources of water comprising lakes, rivers, ponds, creeks, streams, well water, flow-back water, produced water, treated water and any other source of water. Conventional methods of moving water over long distances involve extensive labor, time and transportation of, among other things, fixed-length pipes, fittings, and pumps.

One or more embodiments of the present invention relate to a system, method and computer program product for the rapid deployment and retrieval of a frac water transfer system. Embodiments of the system and method of the present invention employ one or more flexible, lay flat hoses and/or one or more segments of lay flat hose for the transfer of frac water over long distances.

The lay flat hose may be collapsible such that it may lay flat when substantially empty (i.e. substantially devoid of water or other matter). Thus, the lay flat hose can be wound onto spools, folded into flaking boxes, or otherwise stored in a compact manner.

Because the hose is very flexible and conforms to the terrain upon which it is laid, 90°, 45°, 22.5°, or other elbow fittings would not be required in order to have a pipeline containing turns.

Characteristics of fluid flow in a pipe such as working pressure, burst pressure, maximum efficiency rate, and maximum feasible rate are considerably higher and thus more desirable for the lay flat hose than for pipes used in conventional methods for frac water transportation.

The lay flat hose may require fewer connections and pumps than the pipes used in conventional methods for frac water transportation to achieve the desired characteristics during frac water transfer.

Moreover, the lay flat hose is difficult to damage, having a life expectancy of approximately 5 yrs. whereas the pipes used in conventional methods for frac water transportation have a life expectancy of approximately 2 yrs.

In one conventional method, 30 ft. long segments of aluminum piping with an outer diameter of 10 in. are connected in series to form a pipeline for transporting water over a long distance.

A mile of straight piping (i.e., piping containing no turns) may require approximately 176 connections.

Clamp type connections are typically used to join the pipes. For pipelines containing turns, 90°, 45°, 22.5°, or other elbow fittings may be required.

Water may potentially leak through each connection or fitting, thereby decreasing the efficiency of the pipeline and wasting water.

The working pressure of the aluminum piping may be approximately 80 psi and the burst pressure may be approximately 150 psi.

The maximum efficiency rate may be less than 50 bpm and the maximum feasible rate may be approximately 75 bpm.

In another conventional method, 3200 ft. or 500 ft. long segments of polyethylene piping with an outer diameter of 4 in. or 6 in., respectively, are connected in series to form a pipeline for transporting water over a long distance.

Pipelines having these specifications transfer water at low rates and therefore may not be viable for real-time water transfer.

In yet another conventional method, 30 ft. long segments of polyethylene piping with an outer diameter of 12 in. are connected in series to form a pipeline for transporting water over a long distance.

A mile of straight piping may require approximately 176 connections.

Water may potentially leak through each connection, thereby decreasing the efficiency of the pipeline and wasting water.

For pipelines containing turns, 90°, 45°, 22.5°, or other elbow fittings may be required.

The working pressure of the polyethylene piping may be approximately 150 psi and the burst pressure may be approximately 317 psi.

The maximum efficiency rate may be approximately 76 bpm and the maximum feasible rate may be approximately 92 bpm.

Weighing approximately 26 lbs/ft., manual handling of the polyethylene piping segments is impractical.

In one or more embodiments of the invention, a lay flat hose may be deployed in segments ranging from about 5 ft. long to about 700 ft. long and have a nominal inner diameter ranging from about 3 in. to about 16 in.

In one or more embodiments, the lay flat hose is deployed in 500 ft. long segments with a nominal inner diameter of 12 in.

A straight mile of pipeline constructed out of the lay flat hose may require approximately 11 connections.

Because the hose is flexible and conforms to the terrain upon which it is laid, elbow fittings, which are prone to leaking, would not be required for pipelines containing turns. The working pressure of the lay flat hose may be approximately 175 psi and the burst pressure may be approximately 400 psi.

The maximum efficiency rate may be approximately 100 bpm and the maximum feasible rate may be approximately 130 bpm.

The lay flat hose is made of circular woven high tenacity polyester.

An elastomeric polyurethane cover and lining completely encapsulate the polyester.

A variety of other types of lay flat hose may also be available at a range of sizes, materials, and capabilities.

Any lay flat hose suitable for the rapid deployment and retrieval of a frac water transfer system may be used in embodiments of the present invention.

One or more embodiments of the invention are directed to a computer program product for use in connection with the design and deployment of frac water transfer systems in accordance with embodiments of the invention.

The computer program product may generate output data that includes measurements of frac water flow characteristics and/or pressure characteristics determined based on various input parameters.

The output data generated by the computer program product may be utilized in making design and equipment choice/placement decisions in connection with the deployment of frac water transfer systems according to embodiments of the invention.

The computer program product may comprise a computer usable medium having computer readable program code embodied therein.

The computer readable program code may comprise computer readable code for receiving as input one or more terrain parameters.

The terrain parameters may include, but are not limited to, distances between adjacent discrete points along the flow path of the frac water from the source to the destination as well as elevations at discrete points along the path.

The discrete points between which distance measurements may be taken and/or the discrete points at which elevation measurements may be taken may coincide with the endpoints of segments of the flexible hose.

Alternatively, the distance and elevation measurements may be taken continuously at any one or more points along the path traversed by the flexible hose when deployed.

A manual survey of the terrain may be performed to determine the distance and elevation parameters.

Alternatively, or in conjunction with the manual survey, a global positioning system (GPS) device may be employed to precisely measure distances and elevation differences between discrete points along the path.

The GPS device may also be used to take continuous distance and elevation measurements along the flow path.

In addition to the distance and elevation measurements, the terrain parameters may also comprise one or more parameters indicative of a degree of obstruction at one or more discrete points along the path of the flexible hose.

More specifically, the one or more parameters indicative of a degree of obstruction may represent a measure of the degree to which terrain characteristics may obstruct frac water flow through the flexible hose at one or more points along the flow path.

The distance, elevation, and obstruction parameters, along with any other terrain parameters that may be determined, may together provide a comprehensive survey of the terrain.

The computer readable program code may further comprise computer readable program code for receiving as input one or more design parameters.

Design parameters may include a number of and/or locations along the frac water flow path at which one or more pumps and/or one or more filter pods may be placed.

Adjustments to the number and/or placement of pumps and filter pods may affect frac water flow rates and pressure and flow characteristics at various points along the flow path.

The computer program product may take as inputs one or more of the terrain and/or design parameters noted above and generate output data relating to one or more of the following pressure/flow characteristics: water hammer or hydraulic shock effects, wave velocity, friction, hydrostatic head, hydraulic force, pressure loss due to friction, positive pressure needed to overcome friction, or any combination thereof.

However, it should be noted that the above list is not exhaustive and the output data may include any other suitable measurement for assisting in the design, implementation, and deployment of a frac water transfer system according to embodiments of the invention.

In order to generate the output data, the computer program product may also receive, as input, data provided by various measurement devices disposed along the frac water flow path correspondingly to the points between which and at which distance and elevation measurements are taken.

The output data may be provided in the form of a set of pressure profiles reflecting any one or more of the measurements discussed above taken at discrete or continuous points along the frac water flow path.

If the pressure and flow measurements provided by way of the pressure profiles do not conform to desired values, one or more parameters may be adjusted and new output data based on the adjusted parameters may be generated.

This process may be performed iteratively until the desired pressure and flow characteristics are achieved.

More specifically, the path of the flexible hose pipeline from source to destination as well as the location and/or number of pumps and/or filter pods may be determined through an assessment of the output data generated by the computer program product based on iterative adjustments to the input parameters.

Figure 1:
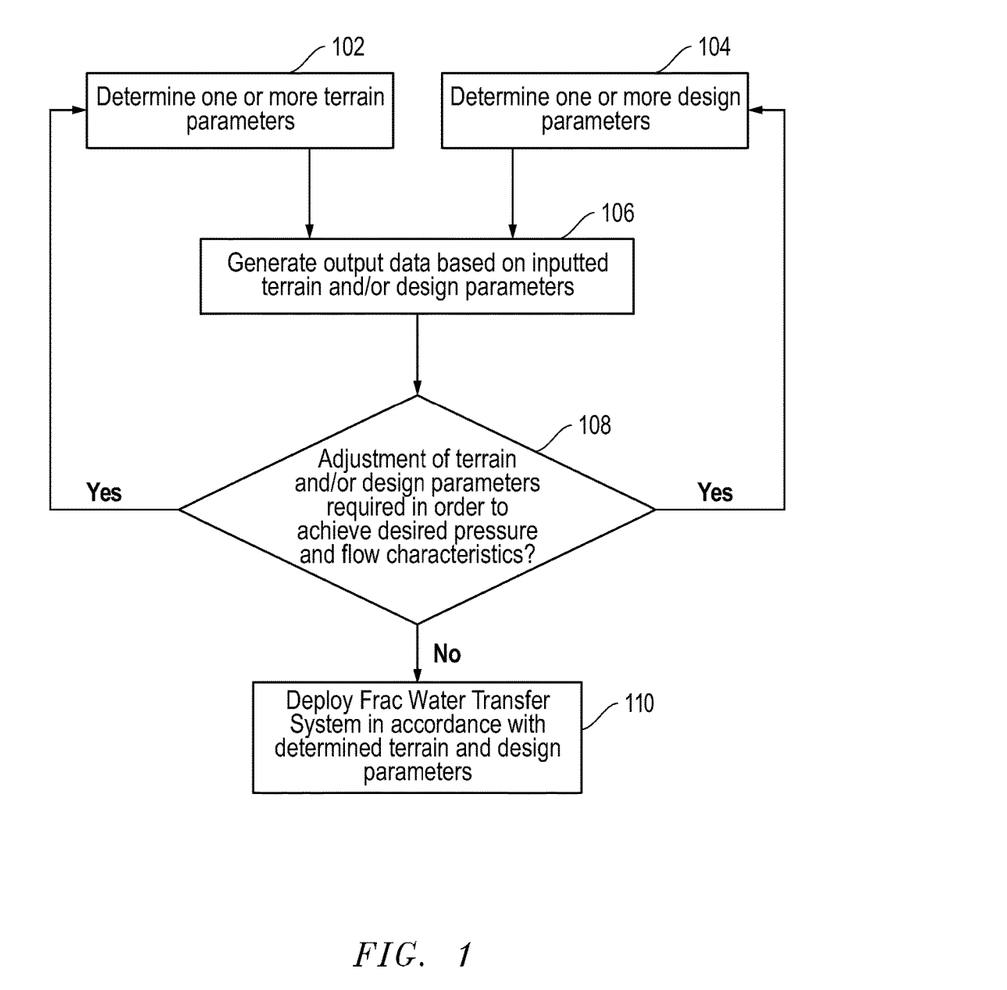
FIG. 1 shows a process flow for the determination of parameters to achieve desired pressure and flow characteristics in connection with the rapid deployment and retrieval of frac water transfer systems in accordance with embodiments of the invention

FIG. 1 depicts a process flow for the determination (and potential iterative adjustment) of terrain and design parameters to achieve desired pressure and flow characteristics in connection with the deployment of frac water transfer systems in accordance with embodiments of the invention.

In steps 102 and 104, one or more terrain parameters and one or more design parameters are determined, respectively. The terrain and design parameters may include any of those previously discussed.

In step 106, these terrain and design parameters are provided as input to the computer program product, which in turn generates output data relating to one or more pressure/flow characteristics of the frac water transfer system.

In step 108, the output data may be assessed to determine whether one or more of the terrain and/or design parameters require adjustment in order to achieve desired pressure/flow characteristics.

For example, a terrain parameter indicative of a degree of obstruction may need to be adjusted (e.g. adjustment of the path traversed by the flexible hose) in order to achieve more desirable pressure and flow characteristics.

Alternatively, or in addition to adjustment of the terrain parameters, one or more design parameters may require adjustment.

For example, the number and/or placement of the pumps and/or filter pods may need to be adjusted in order to achieve desired characteristics.

If any of the terrain or design parameters require adjustment, the process flow returns to steps 102 and/or 104 to once again determine the terrain and/or design parameters.

The computer program product receives these adjusted parameters as input and generates updated output data.

This process may continue iteratively until the terrain and design parameters are such that the computer program product generates final output data demonstrating pressure/flow characteristics within acceptable tolerances from desired measurements.

At that point, in step 110, the frac water transfer system is deployed or modified in accordance with the final terrain and design parameters.

As previously noted, the computer program product may be embodied in one or more computer usable/readable media having computer readable program code embodied thereon. Any combination of computer readable media may be utilized.

A computer readable storage medium may be, for example, but not limited to, a non-transitory medium such as an electronic, magnetic, optical, electromagnetic, infrared, or semiconductor system, apparatus, or device, or any suitable combination of the foregoing.

Alternatively, the computer-readable medium may be a transitory propagation medium. More specific examples (a non-exhaustive list) of computer readable storage media includes the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-transitory computer readable storage medium may be any tangible medium that can contain or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including, but not limited to, an object oriented programming language such as Java, Smalltalk, C++, Python, Ruby, or the like, a common language infrastructure (CLI) language such as C#, C++/CLI, F#, J#, #Smalltalk, or any other CLI implementation of another programming language, and/or "conventional" procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 2:
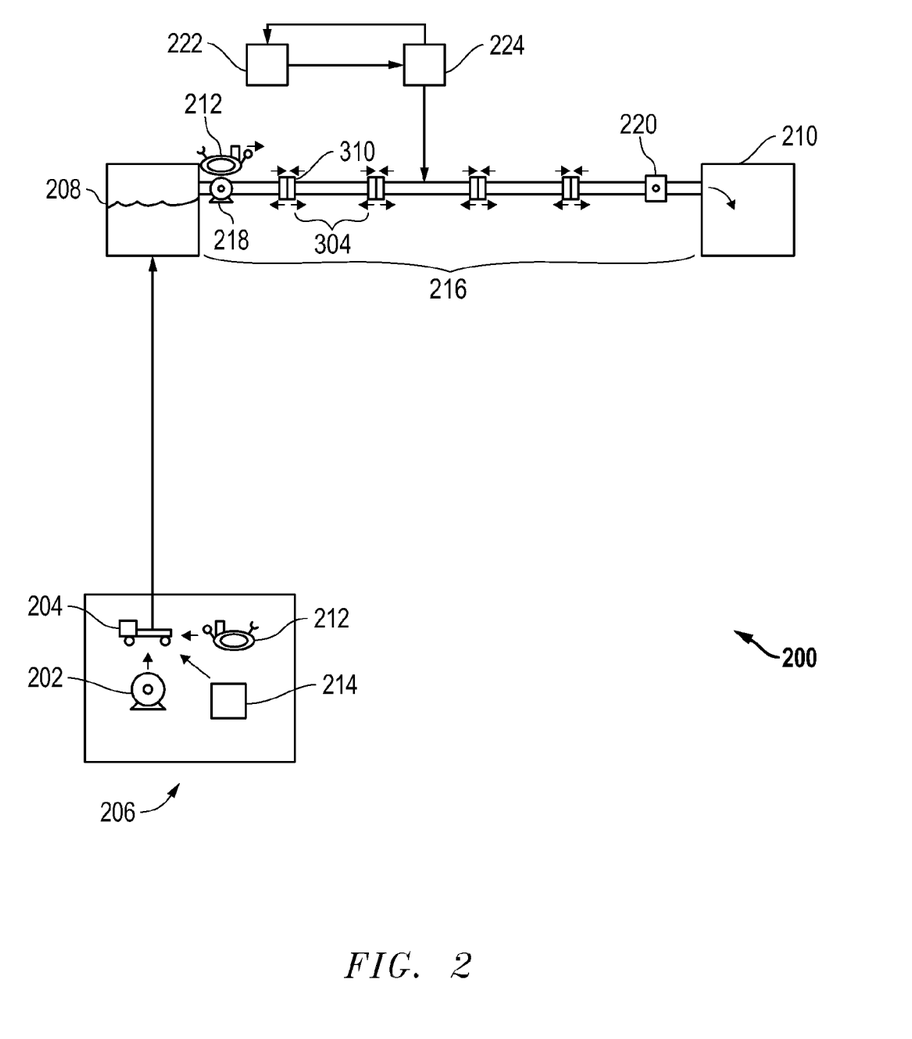
FIG. 2 shows a schematic view of a system for rapid deployment and retrieval of a frac water transfer system in accordance with embodiments of the invention.

One or more embodiments of the present invention comprise a system 200 for rapidly deploying a frac water transfer system in accordance with embodiments of the invention, as depicted schematically in FIG. 2.

The system 200 comprises one or more segments of lay flat hose 304 wound onto one or more spools or reels 202.

The spools 202 comprise a cylindrical core and two sidewalls having a circular cross section.

Figure 3:
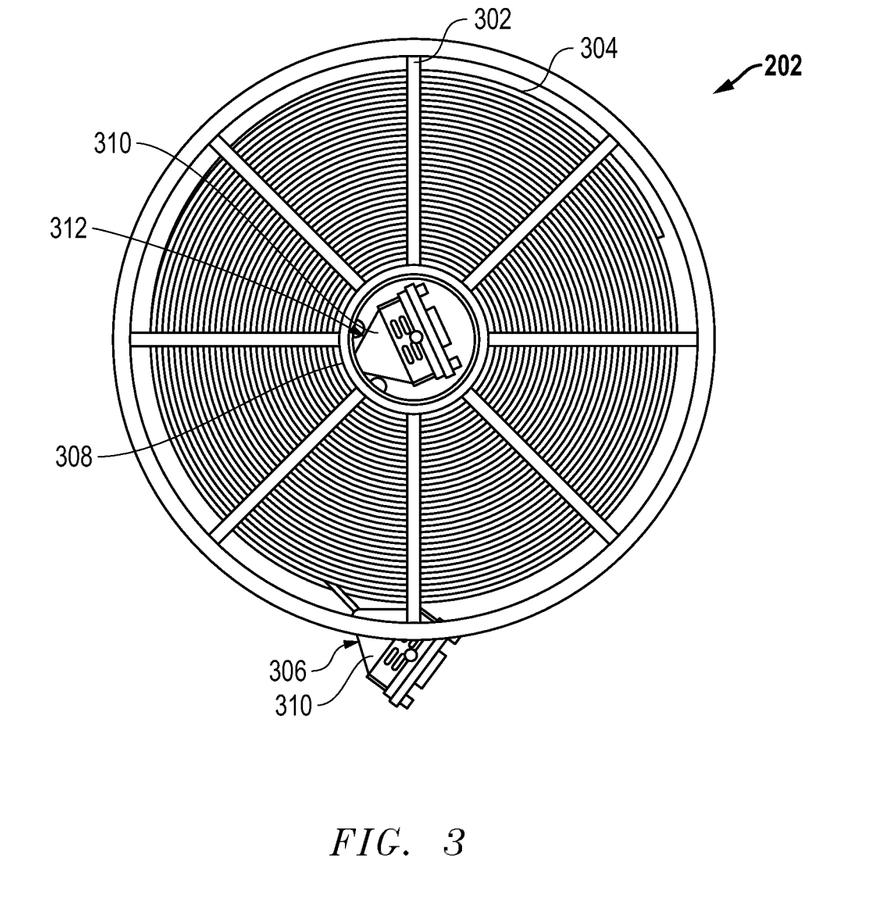
FIG. 3 shows a side view of lay flat hose wound onto a spool in accordance with embodiments of the invention.

In one or more embodiments, the sidewalls of the spools 202 may comprise spokes 302, as illustrated in FIG. 3. Each sidewall further comprises a circumferential surface.

The lay flat hose 304 may be manually wound onto the spools 202. The lay flat hose 304 may comprise a first end 306 and a second end 312. The second end 312 of the lay flat hose 304 is attached to the cylindrical core or drum 308 of the spool 302 such that the end 312 will rotate along with and at substantially the same rate as the drum 308 of the spool 202.

In one or more embodiments, each end 306, 312 of the lay flat hose segment 304 comprises a coupling 310.

While the coupling 310 of the second end 312 may be disposed proximate the outer surface of the drum 308, and the lay flat hose 304 may be wound around both the drum 308 and the coupling 310, such an arrangement may create an irregular shaped spooling resembling an egg.

To avoid the irregular shape, the coupling 310 of the second end 312 may be disposed within the drum 308.

Disposing the coupling 310 within the drum 308 further connects and anchors the second end 312 to the spool 202.

A crank (not shown) that rotates the drum 308 of the spool 202 may be turned manually, thereby rotating and winding the lay flat hose 304 around the drum 308 of the spool 202.

Manual adjustments in alignment of the lay flat hose 304 may be necessary to reduce tangling and ensure that the desired length of lay flat hose 304 fits within the spool's 202 carrying capacity.

The number of spools 202 necessary depends on the desired or required total length of lay flat hose 304, which is determined, in part, by surveying the path from the water source 208 to the destination 210, as described above.

Alternatively, a drive system (not shown) may be used to facilitate winding the segments of lay flat hose 304 onto the spools 202. For example, the drive system may comprise a shaft fitted with friction rollers. The friction rollers may be spaced such that each friction roller aligns with and engages a circumferential surface of a sidewall of the spool 202.

A power source in communication with a motor may rotate the shaft, and consequently rotate the friction rollers, in one direction, causing the spool 202 to rotate in the opposite direction.

The drive system may thus replace the manual crank system described above for winding the segments of lay flat hose 304 onto the spools 202.

In one or more embodiments of the present invention, the spools 202 of lay flat hose 304 may be loaded onto one or more support structures, or "skids" (not shown). The skids allow for a completely self-contained modular system comprising one or more spools 202 of lay flat hose 304.

Each skid may further comprise one or more legs for maintaining the skids in a position suitable for facilitating the loading and offloading of the spools 202 onto and from the skids.

Moreover, the legs may facilitate the loading and offloading of the skids onto and from a vehicle or a trailer towed by a vehicle.

Each skid may further comprise a lifting mechanism allowing for the skid to be self-supported. The lifting mechanism may be any mechanism suitable for lifting the spools 202, and loading or offloading the spools 202 onto or from the skid.

In one or more embodiments of the present invention, the skids may be loaded onto one or more conveyance vehicles 204. Any type of conveyance vehicle 204 suitable for carrying skids or heavy equipment may be used, including, but not limited to: a rollback trailer with a hydraulic lift, a flatbed trailer with a portable forklift, or a flatbed trailer with a knuckle-boom crane.

The skids may be lifted and loaded onto the conveyance vehicle 204 manually or with the aid of machinery suitable for lifting heavy equipment. For example, a forklift or a crane may be used to lift the skids onto the conveyance vehicle 204.

In one or more embodiments of the present invention, the spools 202 may be loaded directly onto the conveyance vehicle 204 without the use of skids. It is to be understood that the present invention envisions the conveyance of modules of multiple spools 202 loaded onto skids and/or spools 202 without skids.

The conveyance vehicle 204 onto which spools 202 are loaded may be a 48 ft. flatbed trailer with the capacity to carry about 14 spools 202, approximately 1.25 mi. of lay flat hose 304.

The use of a flatbed trailer may comply with Department of Transportation (DOT) size and weight requirements.

The use of a flatbed trailer as the conveyance vehicle 204 facilitates the use of a third party contractor for hauling of the load, which reduces the DOT risk exposure of the person or entity hiring the third party contractor.

A desired number of spools 202 may be loaded onto the conveyance vehicle 204. The desired number of spools 202 is determined, in part, based on the total length of lay flat hose 304 needed to complete the designed pipeline 216 and on the conveyance vehicle's 204 carrying capacity.

The conveyance vehicle 204 may be driven from the equipment site 206 to the water source 208 to begin laying the lay flat hose 304 towards the frac water destination 210, i.e., the location to which water will be transported.

The frac water destination 210 may be in the vicinity of the location where the frac job will be performed.

Alternatively, the conveyance vehicle 204 may be driven to the destination 210, and the lay flat hose 304 may be laid towards the water source 208.

Besides spools 202, the conveyance vehicle 204 may carry smaller off-road vehicles 212 and/or various other types of equipment 214 that facilitate the rapid deployment and retrieval of a frac water transfer system in accordance with embodiments of the invention.

One or more conveyance vehicles 204 and/or off-road vehicles 212 may be used to transport additional spools 202 of lay flat hose 304 or other equipment 214, if necessary, to the current pipeline 216 work location.

The current pipeline 216 work location is defined herein as the vicinity of the location at which the last segment of lay flat hose 304 has been laid.

The spools 202 may be offloaded from the conveyance vehicle 204 in a manner similar to that used in loading the skids onto the conveyance vehicle 204.

However, a different manner of offloading the spools 202 from the conveyance vehicle 204 may be used. For example, if a forklift was used to lift and load the spools 202 onto the conveyance vehicle 204, a forklift may also be used to lift and offload the spools 202 from the conveyance vehicle 204. But the spools 202 may also be offloaded manually or with the aid of any other machinery suitable for lifting heavy equipment.

In one or more embodiments, smaller off-road vehicles 212 may be used to transport the spools 202 from the conveyance vehicle 204 to the current pipeline work location.

In one or more embodiments, one or more skids, each having a lifting mechanism, may be used to offload the spools 202 from the skids 120. The off-road vehicle(s) 212 may be one or more all-terrain vehicles (ATVs), each towing a trailer capable of being towed in an all-terrain environment.

The ATVs may position the trailer proximate a skid such that the lifting mechanism of the skid is capable of lifting and offloading a spool 202 from the skid, and lifting and loading the spool 202 onto the ATV-towed trailer.

Alternatively, the spools 202 may be offloaded from the skids and loaded onto the ATV-towed trailers manually, or with the aid of other machinery capable of lifting heavy equipment. The ATVs may be substituted with a different type of off-road vehicle 212 suitable for towing a trailer.

The ATV- or otherwise-towed trailers, each carrying one or more spools 202, may be driven close to the current pipeline 216 work location.

The segment of lay flat hose 304 to be laid may be unwound from the spool 202. The trailer on which the spool 202 is sitting may comprise a friction roller drive mechanism (not shown) for unwinding the lay flat hose 304 from the spool 202.

A shaft comprising mounted friction rollers may be in contact with the circumferential surface of the sidewalls of the spool 202.

A remote hydraulic power pack may provide the source of power to rotate the shaft, thus rotating the friction rollers in the same direction.

The friction rollers may comprise an outside contact surface made of a material having a high coefficient of friction.

The contact of the rotating friction rollers with the circumferential surfaces of the sidewalls of the spool 202 in turn causes the spool 202 to rotate in the direction opposite of that in which the friction rollers (and correspondingly, the shaft) are rotating. As the spool rotates, the lay flat hose 304 may be unwound and offloaded from the spool 202.

In one or more embodiments, the drive mechanism may unwind the lay flat hose 304 from the spools 202 at a rate ranging from about 1 mph to about 4 mph.

Alternatively, or in addition, the off-road vehicle(s) 212 may be one or more tracked carriers or "crawlers" 212 as illustrated in FIGS. 2, 4A-4C, and 6.

The crawler 212 may comprise a bed 402, a lifting subsystem 404, a drive axle subsystem 502, and a tensioning subsystem 602.

The crawler 212 may be designed to be small enough for maneuverability in tight spaces, but yet large enough to optimize the number of trips required to deploy the lay flat hose 304 and to optimize the time required to complete the trips.

In one or more embodiments, the crawler 212 may have a full length ranging from about 12 ft. to about 15 ft., a full width ranging from about 5 ft. to about 7 ft., and a carrying capacity of over 7,000 lbs.

Powered by an engine having between about 70 hp to about 80 hp, the crawler 212 may travel at a maximum speed ranging from about 4 mph to about 8 mph.

Figure 4A:
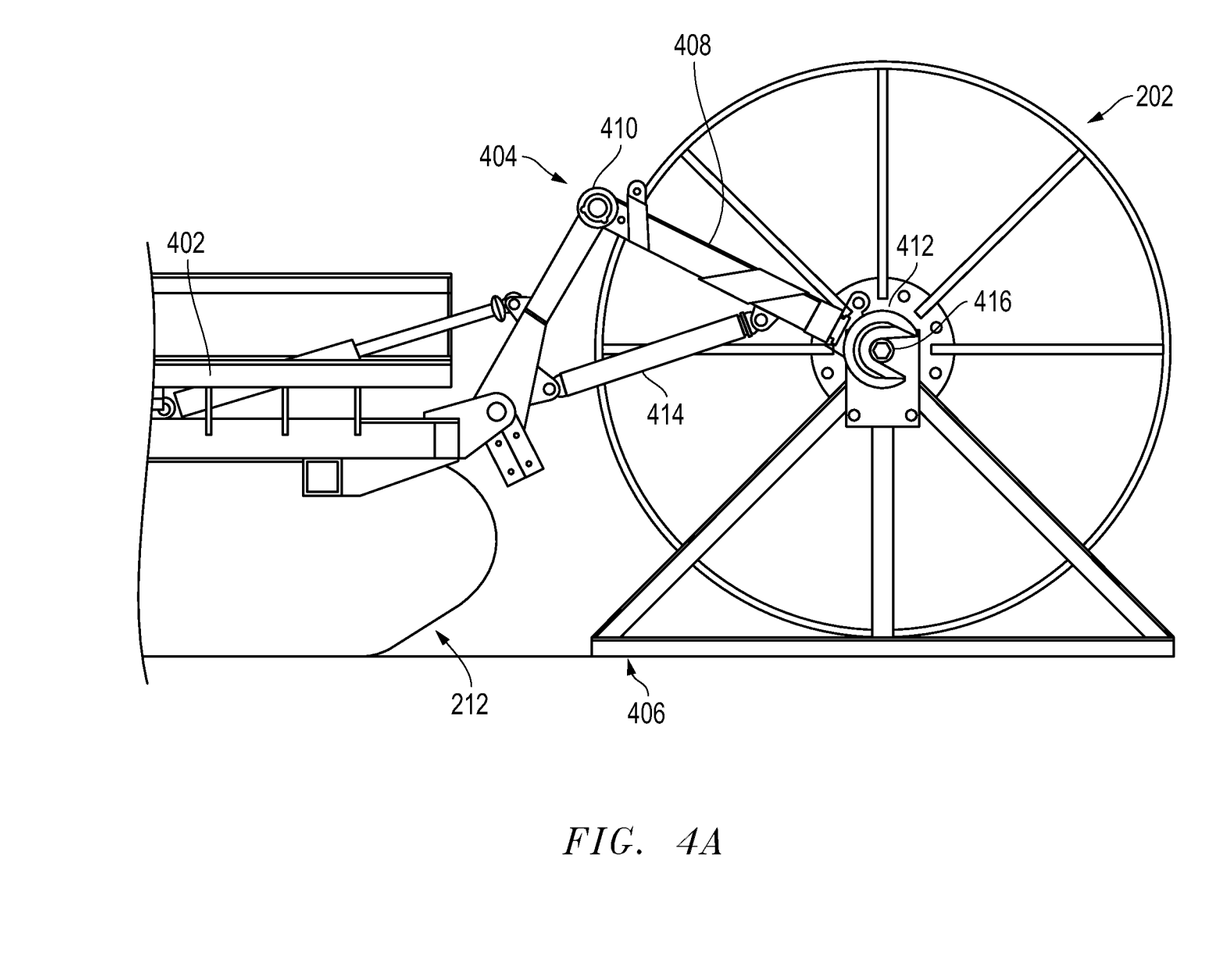
FIGS. 4A-4C show side views of a lifting subsystem in accordance with embodiments of the invention.

A driver-operator of the crawler 212 may be seated in a location relative to the bed 402 such that the lay flat hose 304 may be laid along the pipeline path 216 without obstructing the driver-operator's forward view. The bed 402 may be designed to provide a stable support structure for at least the spool 202, the lay flat hose 304, and the spool's base 406.

Figure 4B:
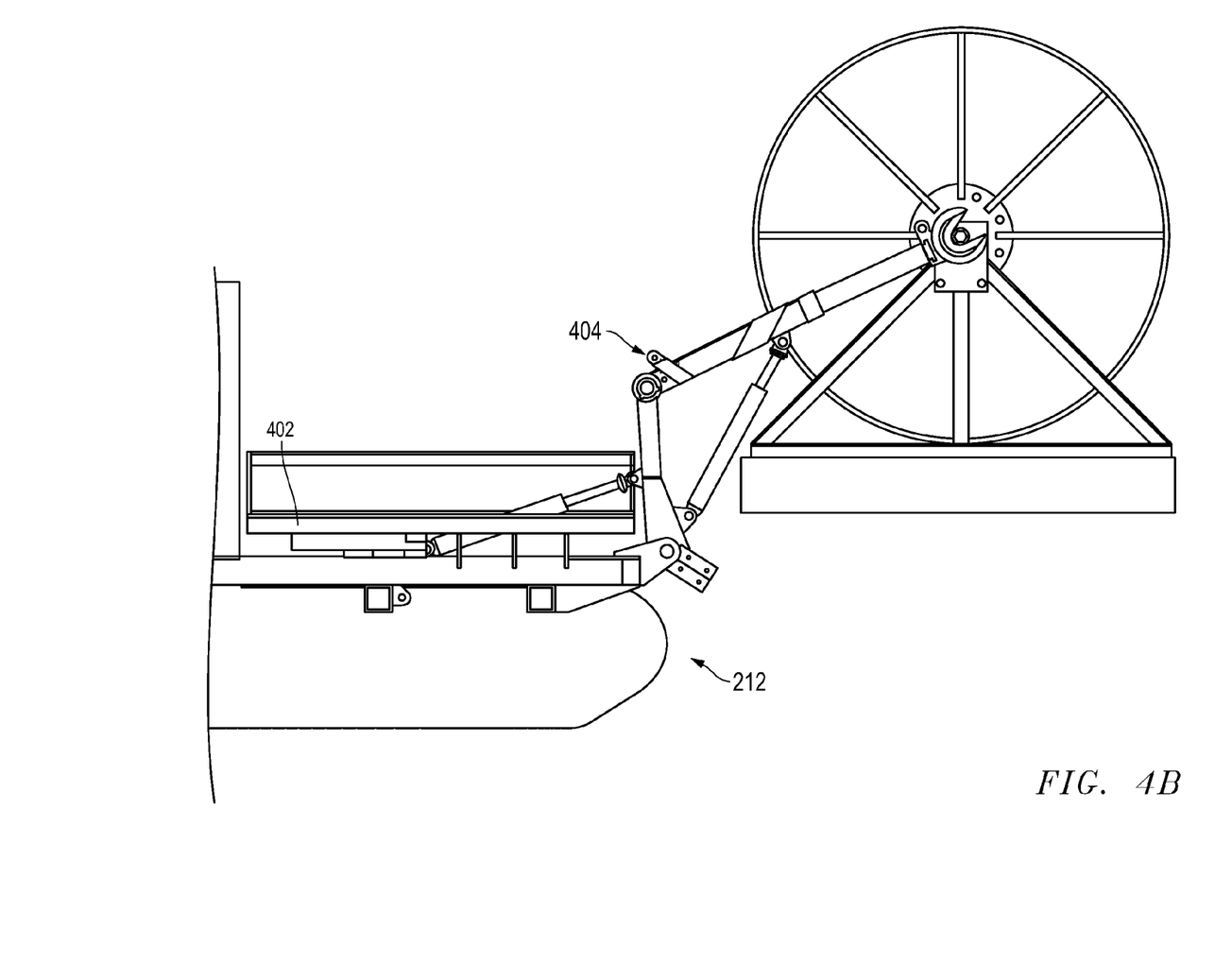
Figure 4C:
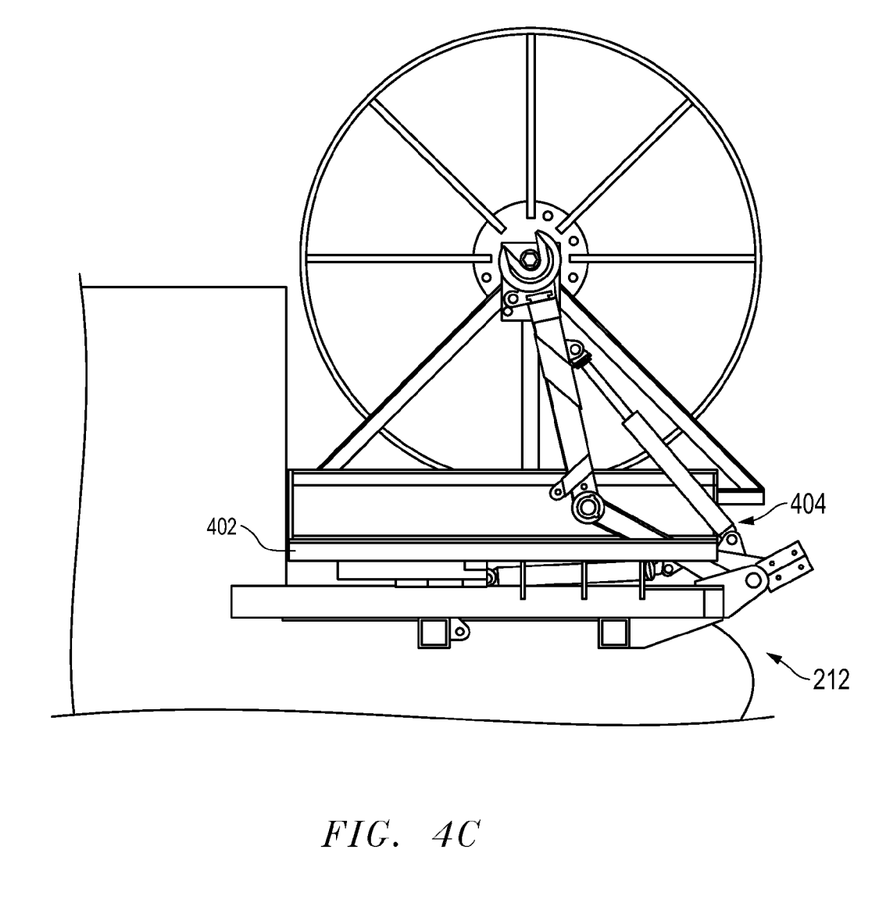

FIGS. 4A-4C illustrate the lifting subsystem 404 of the crawler 212 in accordance with embodiments of the invention.

The lifting subsystem 404 may comprise any mechanism capable of lifting the spool 202 and placing it on the bed 402 of the crawler 212. In one or more embodiments, the lifting subsystem 404 comprises an arm 408. The arm 408 may comprise one or more linkages 410 with a notched or grooved end 412.

An operator may control the movement of the one or more linkages 410 via one or more hydraulic cylinders 414.

The notched or grooved end 412 of the lifting subsystem's 404 arm 408 may engage the circumferential surface of a shaft 416 protruding outwardly from the spool 202. An operator may control the arm 408 to lift the spool 202 off the ground and place the spool 202 onto the bed 402 of the crawler 212 in an upright position. The lifting subsystem 404 of the crawler 212 may also be used to load and offload the spools 202 from the conveyance vehicles 204.

Figure 5:
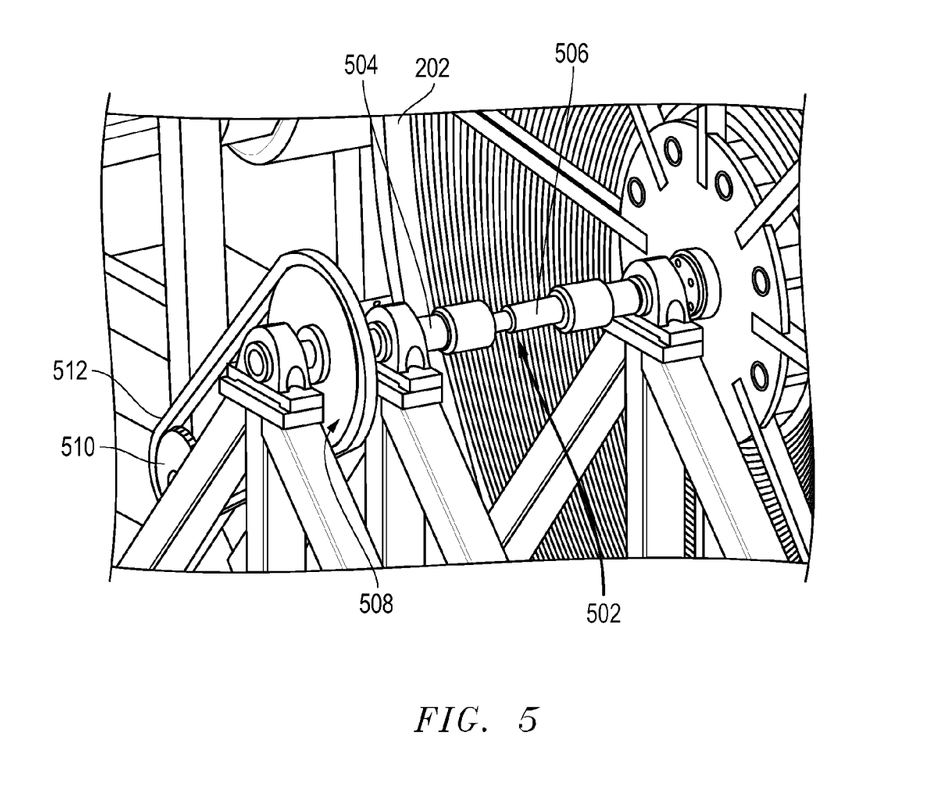
FIG. 5 shows a perspective view of an axial drive subsystem in accordance with embodiments of the invention.

Referring now to FIG. 5, the axle drive subsystem 502 of the crawler 212 may comprise a drive shaft 504 that engages an axial shaft 506 of the spool 202. The end of the drive shaft 504 that does not engage the axial shaft 506 of the spool 202 may be fitted with a first gear 508 (driven gear).

The first gear's 508 rotation correspondingly rotates the axial shaft 506 and the spool 202 in the same direction. A second gear 510 (drive gear) may be substantially aligned in a parallel configuration with the first gear 508. A motor (not shown) may be used to rotate the second gear 510. The teeth of the gears 508, 510 may mesh in order to transmit the motor's torque.

Alternatively, the second gear 510 may be spaced apart from the first gear 508 and a chain 512 may be used to transmit rotary motion from the second gear 510 to the first gear 508. Unlike the meshing configuration in which the gears 508, 510 rotate in opposite directions, the drive chain transmits rotary motion such that the gears 508, 510 rotate in the same direction. Because the first gear's 508 rotation correspondingly rotates the axial shaft 506 and the spool 202 in the same direction, the spool 202 rotates in the same direction as the second gear 510 and motor. Rotation in either direction may lay and/or retrieve the lay flat hose 304.

Figure 6:
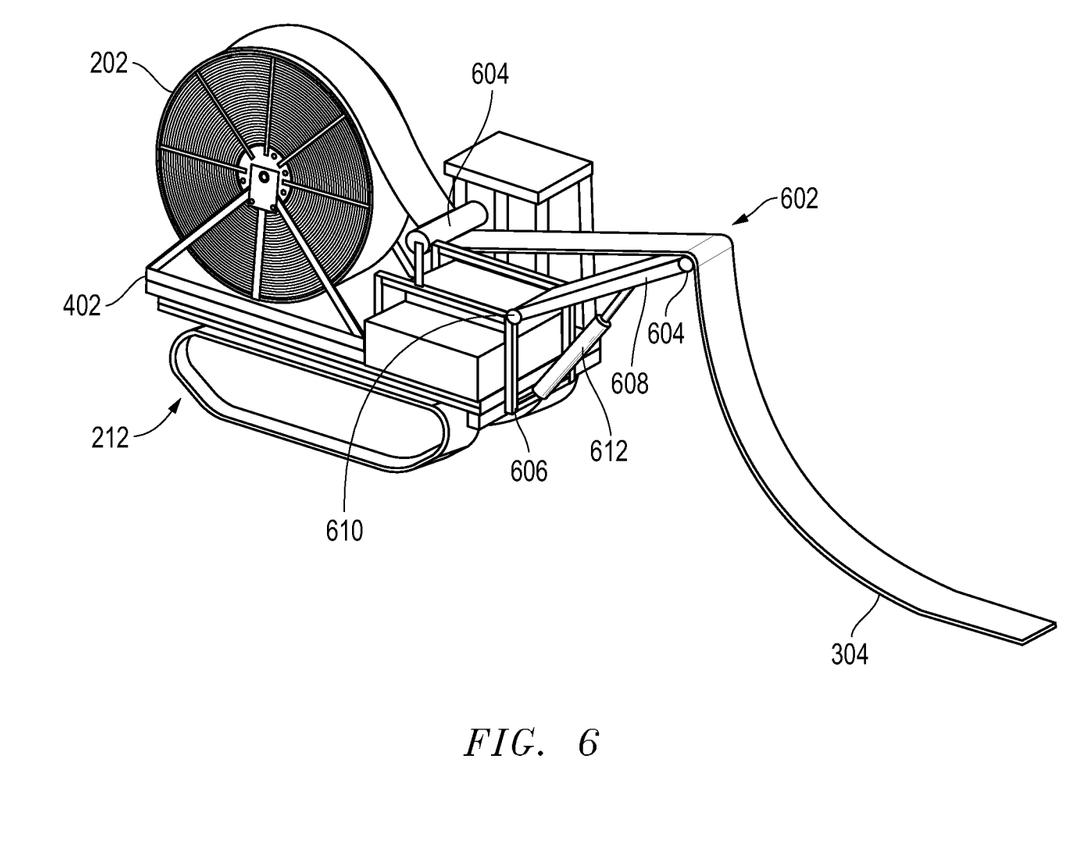
FIG. 6 shows a perspective view of a tensioning subsystem in accordance with embodiments of the invention.

FIG. 6 illustrates the tensioning subsystem 602 of the crawler 212 in accordance with embodiments of the invention.

The tensioning subsystem 602 may comprise a plurality of rollers 604. The lay flat hose 304 may engage the rollers 604 in an alternating over-and-under configuration. The second end 312 of the lay flat hose 304 may be connected to the spool 202 so that the lay flat hose may be retrieved.

The axle drive subsystem 502, described above with reference to FIG. 5, may rotate the spool 202 in either direction to retrieve and wind the lay flat hose 304 onto the spool 202.

As the lay flat hose 304 passes through the rollers 604 of the tensioning subsystem 602, tensile forces act upon the lay flat hose 304, flattening the lay flat hose 304 and ensuring that it is neatly and tightly wound onto the spool 202.

Further, because the tensioning subsystem 602 flattens the lay flat hose 304, fluid is thereby squeezed out and removed from the lay flat hose 304. This water removing effect may efficiently dry the lay flat hose 304 and allows it to be readily deployed for further use or stored for later use.

In one or more embodiments, the rollers 604 of the tensioning subsystem 602 may be disposed towards the front of the crawler 212 to facilitate retrieval of the lay flat hose 304 while the crawler 212 is moving forward.

The rollers 604 may be disposed at a height above the ground sufficient to lift the lay flat hose 304 off the ground to reduce any wear and tear of the lay flat hose 304 that may otherwise occur by its scraping against the ground during retrieval.

In one or more embodiments, the tensioning subsystem 602 may comprise two rollers 604. The rollers 604 may be spaced apart and have parallel axes. The axes of the rollers 604 may also be parallel to the axis of the spool 202. The rollers 604 may be aligned laterally with respect to each other and the spool 602 such that, when the lay flat hose 304 is retrieved, the lay flat hose 304 is pulled longitudinally towards the spool 202 and wound onto the spool 202. The rollers 604 may be attached to a support structure 606 and restricted to a rotational degree of freedom.

The support structure 606 may have a pivotable component 608 to which the forward most roller 604 may be attached. The pivotable component 608 may rotate about pivot 610. A hydraulic cylinder 612 may be attached to the support structure 606 to control rotational movement of the support structure 606, thereby facilitating the raising and lowering of the forward most roller 604.

Referring back to FIGS. 2-3, the first end 306 of the lay flat hose segment 304 is the end that is first unwound and offloaded from the spool 202 as the spool 202 is rotated by the axial drive subsystem 502. The second end 312 of the lay flat hose 304 is the end that is last unwound and offloaded from the spool 202.

The lay flat hose segment 304 may be manually positioned as it unwinds from the spool 202 to ensure placement of the lay flat hose segment 304 suitable for connecting the first end 306 of the lay flat hose segment to the second end 312 of the previously laid lay flat hose segment 304.

The spools 202 may be pre-staged at predetermined positions at which lay flat hose 304 will be needed between the one or more water sources 208 and the one or more destinations 210 to avoid deadheading. The pre-staging positions may be determined based on the terrain parameters gathered from the survey and the output data of the computer program product 224.

Any type of coupling 310 suitable for connecting two ends of the lay flat hose 304 may be used. For example, in one or more embodiments, the first end 306 of each laid hose segment 304 may be connected to the second end 312 of the previously laid lay flat hose segment 304 using an easy to connect, unisex coupling 310 that substantially eliminates water leakage and has a suitable pressure rating.

In the foregoing described manner, the lay flat hose 304 may be connected in series, from end to end, until a pipeline 216 spanning at least the length from the water source 208 to the frac water destination 210, or vice-versa, is constructed.

One or more pumps 218 may be integrated within the pipeline 216 to force the flow of water through the pipeline 216.

One or more filter pods 220 may also be integrated within the pipeline 216 to remove particulate matter originating from the water source 208 before the frac water reaches its destination 210.

More than one lay flat hose 304 pipelines 216 may be constructed as part of the rapid deployment and retrieval of a system for transferring frac water.

As previously described, design parameters 222 may be determined based in part on insight gained from the computer program product 224.

In one or more embodiments of the system, the lay flat hose 304 may be folded and packed into flaking boxes (not shown) rather than wound onto spools 202. The flaking boxes are driven to the current pipeline work location in a conveyance vehicle 204. In one aspect, one or more flaking boxes may be modularly supported in skids. In another aspect, no skids are used, and the flaking boxes are instead transported to the current pipeline work location in a manner such that they can be handled individually. Each flaking box may be loaded onto a conveyance vehicle 204 suitable for carrying loads in an all-terrain environment. The conveyance vehicle may be driven to the vicinity of where the lay flat hose will be laid. The lay flat hose may be manually withdrawn from the flaking box.

Alternatively, a drive mechanism (not shown) may aid in withdrawing the lay flat hose from the flaking box.

In one or more embodiments, a multi-chamber blending manifold may be incorporated to combine multiple fluids, including frac water from one or more water sources, the multi-chamber blending manifold mixing the fluids into a homogeneous solution before discharge into the working tanks.

Frac water optimization methods may also be incorporated to provide the ability to deliver optimal volumes of a frac fluid containing optimal concentrations of one or more additives to a well bore.

The multi-chamber blending manifold described in U.S. Provisional Application No. 61/479,641 and the frac water optimization methods described in U.S. Pub. No. 2010/0059226 A1 are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

One or more embodiments of the invention are directed to methods for the rapid deployment and retrieval of frac water transfer systems in accordance with embodiments of the invention.

Methods have been described in detail above in connection with the computer program products and the systems.

Figure 7:
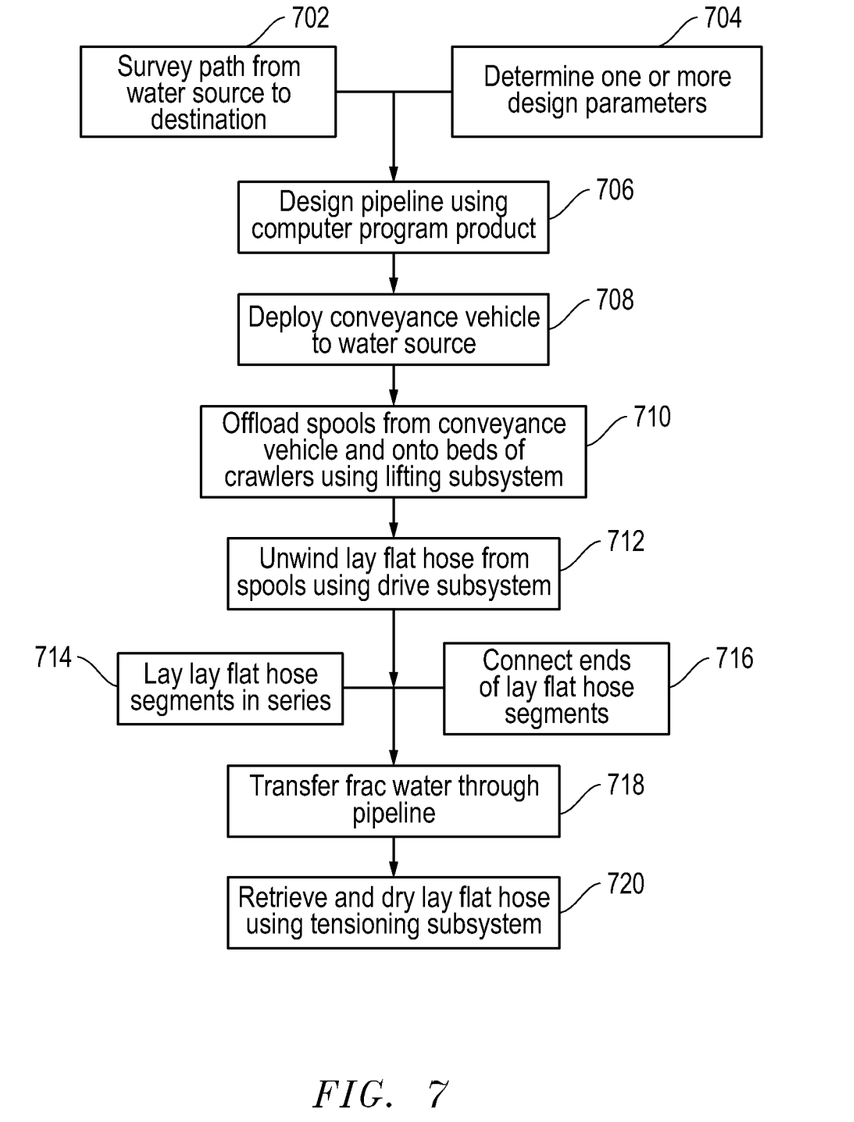
FIG. 7 shows a process flow of a method for rapid deployment and retrieval of a frac water transfer system in accordance with embodiments of the invention.

Embodiments of the methods are further depicted by the flow chart in FIG. 7. The methods involve surveying the path from the frac water source to the destination 702, as described above with reference to FIG. 1, and determining one or more design parameters 704 to use as input for the computer program product.

The methods further involve designing a lay flat hose pipeline based on the computer program product's output 706.

Input parameters may be adjusted in order to achieve the desired pressure and flow characteristics of the pipeline design.

In step 708, one or more conveyance vehicles may be deployed from the equipment site to the water source.

The conveyance vehicles may haul lay flat hose wound onto spools, crawlers, and/or other equipment.

In step 710, the spools may be offloaded from the conveyance vehicles and onto the beds of the crawlers using the crawlers' lifting subsystem as described above with reference to FIGS. 4A-4C.

In step 712, the lay flat hose may be unwound from the spools using the crawlers' drive subsystem as described above with reference to FIG. 5.

In steps 714 and 716, segments of the lay flat hose are laid in series and connected along the designed pipeline path from the frac water source to the destination. As each segment of lay flat hose is laid on the ground, the first end of the lay flat hose segment is connected to the second end of the previously laid lay flat hose segment using sexless easy to connect couplings. Frac water may be transferred at high rates through the constructed lay flat hose pipeline 718 from the water source to the destination.

In step 720, the lay flat hose may be retrieved and dried using the crawler's tensioning subsystem. The tensioning subsystem may prepare the lay flat hose to be readily deployed for further use or to be stored for later use.

In one sample job using a conventional method, 10 in. aluminum piping was used to transfer water from a frac water source to a frac water destination.

Although the distance between the frac water source and the frac water destination was about 3.13 mi., approximately 6.26 mi. of aluminum piping was required to complete the job, as two pipelines were assembled to transfer water in parallel. Also required were: 1,143 connections; 16 angled fittings; 15 vents; 15 drains; 32 truck loads of equipment; 8 personnel; and 6 trucks. The job consumed 12 days: four days for rig up, four days for pumping, and four days for rig down. A total of about 148 one-way vehicular trips and about 1,056 person-hours were required to complete the job.

The same job was modeled using one or more embodiments of the computer program product described above to determine the theoretical results of using the rapid deployment frac water transfer system according to one or more embodiments of the present invention.

It was determined that only one or two high pressure pumps might be required to complete the same sample job described above.

Further, only one pipeline having a length of about 3.13 mi. might be required to complete the job, as opposed to the two pipelines working in parallel required using the conventional method. Also required in the model were: 25-40 connections; zero angled fittings (as the lay flat hose is flexible); virtually zero vents and/or drains; four truck loads of equipment; three personnel; and three trucks. The modeled job consumed six days: one day for rig up, four days for pumping, and one day for rig down. The theoretical results yielded by the model required a total of about 50 one-way vehicular trips and about 288 person-hours to complete the job.

Accordingly, compared to conventional methods, embodiments of the present invention may substantially reduce the number of person-hours and the number of one-way vehicular trips required to complete the pipeline, thereby reducing cost and the potential for harm to humans and the environment.

| Table of Reference Numerals | |
| --- | --- |
| Reference No. | Description |
| 102 | step |
| 104 | step |
| 108 | step |
| 110 | step |
| 120 | skids |
| 200 | system |
| 202 | one or more spools or reels |
| 204 | one or more conveyance vehicles |
| 206 | equipment site |
| 208 | water source |
| 210 | frac water destination |
| 212 | off-road vehicles |
| 212 | crawler |
| 214 | various other types of equipment |
| 216 | current pipeline |
| 218 | one or more pumps |
| 222 | design parameters |
| 224 | computer program product |
| 302 | spokes |
| 304 | one or more segments of lay flat hose |
| 306 | first end |
| 308 | drum |
| 310 | coupling |
| 312 | second end |
| 402 | bed |
| 404 | lifting subsystem |
| 406 | spool's base |
| 408 | arm |
| 410 | one or more linkages |
| 412 | notched or grooved end |
| 414 | one or more hydraulic cylinders |
| 502 | drive axle subsystem |
| 504 | drive shaft |
| 506 | axial shaft |
| 508 | first gear |
| 510 | second gear |
| 512 | chain |
| 602 | tensioning subsystem |
| 604 | plurality of rollers |
| 606 | support structure |
| 608 | pivotable component |
| 610 | pivot |
| 612 | hydraulic cylinder |
| 704 | one or more design parameters |
| 706 | computer program product output |
| 708 | step |
| 710 | step |
| 712 | step |
| 714 | step |
| 716 | step |
| 718 | lay flat hose pipeline |
| 720 | step |

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The invention claimed is:

1. A system for transferring frac water between a source of the frac water and a frac water destination, the system comprising:
   a portable frac water delivery subsystem,
   the portable frac water delivery subsystem comprising:
      one or more segments of a lay flat hose;
      one or more tracked carriers for transporting the lay flat hose,
      the one or more tracked carriers each comprising:
         a tensioning subsystem
            for flattening the one or more segments of the lay flat hose to be wound onto one or more spools,
         the one or more segments of the lay flat hose
         connected in series to assemble one or more pipelines
         for transferring the frac water from the source of the frac water to the frac water destination.

2. The system of claim 1,
   the one or more tracked carriers each further comprising
      a lifting subsystem for
         loading the one or more spools onto the tracked carrier and/or
         offloading the one or more spools from the tracked carrier,
      the lifting subsystem comprising:
         an arm,
            the arm selectively engaging the one or more spools;
         one or more linkages
            connecting the arm to the tracked carrier; and
         one or more hydraulic cylinders
            for controlling the movement of the one or more linkages.

3. The system of claim 2, the tensioning subsystem further comprising:
   a drive subsystem
      for rotating the one or more spools;
   a plurality of rollers
      selectively engaging the one or more segments of the lay flat hose, the drive subsystem
      selectively activated to wind the one or more segments of the lay flat hose onto the one or more spools,
   the one or more segments of the lay flat hose
   routed through the plurality of rollers
   in an alternating over and under configuration.

4. The system of claim 3,
   the tensioning subsystem substantially removing water from the one or more segments of the lay flat hose.

5. The system of claim 1,
   the subsystem for determining one or more characteristics of the frac water transfer system further comprising:
   means for measuring one or more terrain parameters
      between the frac water source and the frac water destination; and
   means for designing a pipeline to be assembled between
      the frac water source and the frac water destination,
   the means for designing
      receiving the one or more terrain parameters as input and
      generating output data,
   the output data presented as a set of pressure profiles
   reflecting one or more measurements
   relating to one or more characteristics of the pipeline to be assembled.

6. The system of claim 1, further comprising
   one or more conveyance vehicles
      for transporting equipment between
         an equipment storage site and
         the frac water source and/or the frac water destination,
      the equipment comprising
         the one or more spools.

7. A method of deploying a system for transferring frac water between a source of the frac water and a frac water destination, the method comprising:
   deploying a portable frac water delivery subsystem,
      the portable frac water delivery subsystem comprising:
         one or more segments of a lay flat hose;
         one or more tracked carriers for transporting the lay flat hose,
         the one or more tracked carriers each comprising:
            a tensioning subsystem for flattening
               the one or more segments of the lay flat hose
               to be wound onto one or more spools;
   assembling one or more pipelines for transferring the frac water
   from the source of the frac water to the frac water destination.

8. The method of claim 7, further comprising
   conveying one or more spools to the frac water source and/or the frac water destination,
   the one or more spools
   wound with the one or more segments of the lay flat hose.

9. The method of claim 7, further comprising
   loading the one or more spools onto the one or more tracked carriers and/or
   offloading the one or more spools from the one or more tracked carriers,
   each tracked carrier further comprising
      a lifting subsystem,
      the lifting subsystem comprising:
         an arm,
            the arm selectively engaging the one or more spools;
         one or more linkages
            connecting the arm to the tracked carrier; and
         one or more hydraulic cylinders
            for controlling the movement of the one or more linkages.

10. The method of claim 9, further comprising
    retrieving the one or more segments of the lay flat hose from the ground, comprising:
    selectively engaging the tensioning subsystem
       with the one or more segments of the lay flat hose,
    tensioning subsystem further comprising:
       a plurality of rollers; and
       a drive subsystem
          for rotating the one or more spools;
    routing the one or more segments of the lay flat hose
       through the plurality of rollers; and
    winding the one or more segments of the lay flat hose
       onto the one or more spools.

11. The method of claim 10, the retrieving the one or more segments of the lay flat hose from the ground further comprising
    substantially removing water from the one or more segments of the lay flat hose.

12. The method of claim 7, the assembling the pipeline further comprising
    connecting a plurality of segments of the lay flat hose in series,
    the ends of the segments of the lay flat hose fitted with sexless couplings.

* * * * *